(12) United States Patent
Nelson et al.

(10) Patent No.: US 7,788,845 B2
(45) Date of Patent: Sep. 7, 2010

(54) FLY TRAP WITH MULTIPLE LIGHT PATTERNS

(75) Inventors: Thomas D. Nelson, Maplewood, MN (US); Oliver A. Ossanna, Bloomington, MN (US); Douglas G. Anderson, Lakeville, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 11/872,429

(22) Filed: Oct. 15, 2007

(65) Prior Publication Data

US 2008/0134567 A1    Jun. 12, 2008

Related U.S. Application Data

(60) Continuation of application No. 10/033,634, filed on Dec. 27, 2001, now abandoned, which is a division of application No. 08/629,049, filed on Apr. 8, 1996, now Pat. No. 6,959,510, which is a continuation-in-part of application No. 08/327,108, filed on Oct. 21, 1994, now Pat. No. 5,505,017, which is a continuation of application No. 08/000,264, filed on Jan. 4, 1993, now Pat. No. 5,365,690.

(51) Int. Cl.
*A01M 1/08* (2006.01)
(52) U.S. Cl. .......................................... 43/113
(58) Field of Classification Search ............... 43/113
See application file for complete search history.

(56) References Cited

U.S. PATENT DOCUMENTS 944,882 A    12/1909    Laube (Continued)

FOREIGN PATENT DOCUMENTS

CA    656989    1/1963

(Continued)

OTHER PUBLICATIONS

"Design Parameters That Affect the Performance of UV-emitting Traps in Attracting House Flies (Diptera: Muscidae)," L.G. Pickens et al., Journal of Economic Entomology, vol. 79, No. 4, Aug. 1986, pp. 1003-1009.

(Continued)

*Primary Examiner*—Christopher P Ellis
(74) *Attorney, Agent, or Firm*—Andrew D. Sorensen; Laura C. DiLorenzo; Amy J. Hoffman

(57) ABSTRACT

An insect trap using attractant light, comprising a source of insect attractant light and a housing that can be mounted on a generally planar or flat mounting surface. The housing and the source of light cooperate to form a bidirectional or a multidirectional (overlapping or non-overlapping) pattern of insect attractant light. The housing comprises one, two or more openings for the insect attractant light that is reflected and radiated onto the flat mounting surface. The housing and the source of insect attractant light can cooperate to form a light pattern directed in a continuous display pattern that can surround the housing. The housing openings further facilitate the entry of flying insect pests into the trap. As the insects enter the trap, they are immobilized on an insect immobilization surface mounted within the trap. Cooperation between direct radiant light, reflected light and the position of the housing and insect immobilization surface forms at least two (preferably non-overlapping) light displays that can substantially increase capture rates when compared to prior traps. The trap can also display a light pattern substantially surrounding the trap housing.

69 Claims, 4 Drawing Sheets

U.S. PATENT DOCUMENTS

| | | | |
|---|---|---|---|
| 970,784 A | 9/1910 | Buhm | |
| 1,009,580 A | 11/1911 | Robinson | |
| 1,019,410 A | 3/1912 | Baker | |
| 1,280,359 A | 10/1918 | Abresch | |
| 1,304,397 A | 5/1919 | Snead | |
| 1,333,454 A | 3/1920 | Sato | |
| 1,607,413 A | 11/1926 | Tillson | |
| D77,408 S | 1/1929 | Hall | |
| 1,732,272 A | 10/1929 | Kurtz | |
| D80,735 S | 3/1930 | Lazerson | |
| 1,751,130 A | 3/1930 | Cornelius | |
| D81,664 S | 7/1930 | Rubins | |
| 1,770,626 A * | 7/1930 | Richards | 43/113 |
| 1,820,813 A | 8/1931 | Loomis | |
| 2,065,047 A * | 12/1936 | Buford | 43/113 |
| 2,113,409 A * | 4/1938 | Niemeyer | 43/113 |
| D109,522 S | 5/1938 | Perkins | |
| D110,451 S | 7/1938 | Arenberg | |
| 2,177,846 A | 10/1939 | Swangren | |
| 2,198,807 A * | 4/1940 | Eshbaugh | 43/113 |
| D128,175 S | 7/1941 | Rebechini | |
| 2,286,568 A | 6/1942 | Petry | |
| 2,384,930 A | 9/1945 | Kendrick | |
| D160,809 S | 11/1950 | Schear | |
| D162,345 S | 3/1951 | Roney | |
| 2,577,436 A | 12/1951 | Smith | |
| 2,645,877 A | 7/1953 | Pohlman | |
| 2,731,762 A | 1/1956 | Jones | |
| 2,786,298 A | 3/1957 | Smith | |
| 2,787,083 A | 4/1957 | Jones | |
| 2,791,864 A | 5/1957 | Chappell | |
| 3,023,539 A | 3/1962 | Emerson, Jr. | |
| 3,059,373 A * | 10/1962 | Gardner | 43/113 |
| 3,187,458 A * | 6/1965 | Densmore | 43/113 |
| 3,305,965 A | 2/1967 | Cornell, III | |
| 3,346,988 A | 10/1967 | Fm | |
| 3,348,332 A | 10/1967 | Fee et al. | |
| 3,465,468 A * | 9/1969 | Takamoto | 43/113 |
| 3,491,478 A | 1/1970 | Gilbert | |
| 3,513,585 A | 5/1970 | Ross | |
| 3,540,145 A * | 11/1970 | McEwen | 43/113 |
| D221,893 S | 9/1971 | Peasley | |
| D221,898 S | 9/1971 | Peasley | |
| 3,653,145 A | 4/1972 | Stout | |
| 3,685,198 A | 8/1972 | Smith | |
| D225,631 S | 12/1972 | Gilbert | |
| 3,768,196 A | 10/1973 | Iannini | |
| 3,913,259 A | 10/1975 | Nishimura et al. | |
| 3,998,000 A | 12/1976 | Gilbert | |
| 4,027,151 A | 5/1977 | Barthel | |
| 4,044,494 A | 8/1977 | Grajnert | |
| 4,074,457 A | 2/1978 | Sato et al. | |
| 4,117,624 A | 10/1978 | Phillips | |
| 4,127,961 A | 12/1978 | Phillips | |
| 4,141,173 A * | 2/1979 | Weimert et al. | 43/113 |
| 4,147,947 A | 4/1979 | Hoeh | |
| 4,157,629 A | 6/1979 | Parks | |
| D253,606 S | 12/1979 | Yavnieli | |
| 4,182,069 A * | 1/1980 | De Yoreo | 43/112 |
| 4,212,129 A | 7/1980 | Shumate | |
| 4,229,779 A | 10/1980 | Bilson et al. | |
| 4,332,100 A | 6/1982 | Schneider | |
| 4,366,643 A | 1/1983 | Boaz | |
| D269,632 S | 7/1983 | Roberston et al. | |
| 4,411,093 A | 10/1983 | Stout et al. | |
| 4,490,937 A | 1/1985 | Yavieli | |
| 4,490,938 A | 1/1985 | Baker | |
| 4,577,434 A | 3/1986 | Davis | |
| D286,206 S | 10/1986 | Joosten | |
| D288,247 S | 2/1987 | De Lucchi | |
| 4,686,789 A | 8/1987 | Williams | |
| 4,694,604 A | 9/1987 | Mitchell | |
| 4,696,126 A | 9/1987 | Grothaus et al. | |
| D292,525 S | 10/1987 | Van Deelen | |
| D292,531 S | 10/1987 | Van Deelen | |
| 4,700,506 A | 10/1987 | Williams | |
| D298,260 S | 10/1988 | Yoshida et al. | |
| D298,360 S | 11/1988 | Dacanay et al. | |
| D298,661 S | 11/1988 | Gismondi | |
| 4,829,702 A | 5/1989 | Silvandersson | |
| 4,841,669 A | 6/1989 | Demarest et al. | |
| 4,876,822 A * | 10/1989 | White | 43/113 |
| 4,918,856 A | 4/1990 | Olive et al. | |
| D308,260 S | 5/1990 | Shemitz | |
| D309,791 S | 8/1990 | Boccato et al. | |
| D309,792 S | 8/1990 | Mangiarotti | |
| D309,795 S | 8/1990 | Sahlen | |
| D309,972 S | 8/1990 | Chiba | |
| 4,949,501 A | 8/1990 | Larkin | |
| D311,256 S | 10/1990 | Frattini | |
| 4,959,923 A | 10/1990 | Aiello et al. | |
| 4,979,329 A | 12/1990 | Olive et al. | |
| 4,992,268 A | 2/1991 | Landolt et al. | |
| 4,999,754 A | 3/1991 | Gary | |
| D316,306 S | 4/1991 | Shemitz | |
| D319,320 S | 8/1991 | Wilda | |
| 5,044,112 A | 9/1991 | Williams | |
| 5,046,280 A | 9/1991 | Foster et al. | |
| D320,668 S | 10/1991 | von Kluck | |
| D323,906 S | 2/1992 | Miranda et al. | |
| 5,090,153 A | 2/1992 | Mullen et al. | |
| D324,742 S | 3/1992 | von Kluck | |
| D325,954 S | 5/1992 | Lazzeroni, Sr. et al. | |
| 5,111,610 A | 5/1992 | Morisset | |
| 5,142,815 A | 9/1992 | Birdsong | |
| 5,170,583 A | 12/1992 | Coaker et al. | |
| D335,912 S | 5/1993 | Brown et al. | |
| 5,259,153 A | 11/1993 | Olive et al. | |
| 5,278,737 A | 1/1994 | Luce et al. | |
| D346,869 S | 5/1994 | Houssian | |
| D346,870 S | 5/1994 | Houssian | |
| 5,331,760 A | 7/1994 | DuMont | |
| 5,365,690 A | 11/1994 | Nelson et al. | |
| 5,425,197 A | 6/1995 | Smith | |
| 5,505,017 A | 4/1996 | Nelson et al. | |
| 5,634,292 A | 6/1997 | Kitterman | |
| 5,651,211 A | 7/1997 | Regan et al. | |
| 5,657,576 A | 8/1997 | Nicosia | |
| 5,713,153 A | 2/1998 | Cook et al. | |
| 5,365,690 A | 3/1998 | Nelson et al. | |
| 5,722,199 A | 3/1998 | Demarest et al. | |
| 5,974,727 A | 11/1999 | Gilbert | |
| D422,334 S | 4/2000 | Engelbrecht | |
| 6,108,966 A | 8/2000 | Otomo et al. | |
| 6,289,629 B2 | 9/2001 | Greening | |
| 6,493,986 B1 | 12/2002 | Nelson et al. | |
| 6,959,510 B1 | 11/2005 | Nelson et al. | |
| 2002/0139040 A1 | 10/2002 | Burrows et al. | |
| 2003/0079398 A1 | 5/2003 | Holmes | |
| 2003/0089024 A1 | 5/2003 | Nelson et al. | |

FOREIGN PATENT DOCUMENTS

| | | |
|---|---|---|
| CH | 631 324 | 8/1982 |
| DE | 373240 | 4/1923 |
| DE | 35 06 030 A1 | 8/1986 |
| DE | 38 10 065 C1 | 4/1989 |
| DE | 38 40 440 A1 | 10/1989 |
| DE | 38 40 440 C2 | 8/1990 |
| FR | 2 551 322 | 3/1985 |
| JP | 50-35778 | 4/1975 |
| JP | 64-55137 | 3/1989 |
| JP | 2-174627 | 7/1990 |
| JP | 3-250501 | 11/1991 |

| | | |
|---|---|---|
| WO | WO 82/00567 | 3/1982 |
| WO | WO 92/20224 | 11/1992 |

OTHER PUBLICATIONS

"Effect of Components on Insect Llight Trap Performance," J. P. Hollingsworth et al., TRANSACTIONS of the American Society of Agricultural Engineers, vol. 15, No. 5, pp. 924-927.
"Electronics, adhesive offer sanitary fly control," Ecompetitive Literature Review, Publication: Pest Control, Nov. 1992.
Gilbert Insect Light Traps product literature (Date Unknown).
I-O-C™ Insect-O-Cutor product literature (Date Unknown).
Micro-Gen Introduces: The Vector™ Fly System product literature (Date Unknown).
Venus Flylite™ product literature (Date Unknown).
U.S. Appl. No. 08/629,049, filed Apr. 8, 1996.
U.S. Appl. No. 09/972,456, filed Oct. 5, 2001.
U.S. Appl. No. 10/159,325, filed May 31, 2002.
McGraw-Hill Dictionary of Scientific and Technical Terms, Daniel N. Lapedes Editor in Chief, McGraw-Hill Book Company, 7 pages (1974).
Brochure, "ZAP® Insect-Electrocutor 24-Hour Automatic, Positive, Non-Chemical Flying Insect Control," *Gardner Manufacturing Co.*, 16 pgs. (1972).
"The Fly Terminal™," *Frank Miller & Sons*, 2 pgs. (1993).
Brochure, "Venus Flylite™," *Atlantic Research & Development, Inc.*, 4 pgs. (1989).
Pickins, L. et al., "Design Parameters That Affect the Performance of UV-emitting Traps in Attracting House Flies (Diptera: Muscidae)," *Journal of Economic Entomology*, vol. 79, No. 4, pp. 1003-1009 (1986).
Hollingsworth, J. et al., "Effect of Components on Insect Light Trap Performance," *Transactions of the ASAE*, vol. 15, No. 5, 4 pgs. (1971).
Competitive Literature Review, "Electronics, adhesive offer sanitary fly control," *Pest Control*, 1 pg. (Nov. 1992).
Brochure, "Venus Flylite™," 6 pgs. (Jun. 1992).
Brochure, "ZAP® Gardner Insect-Electrocutor Systems, 24-hour Automatic, Positive, Non-Chemical Fly & Insect Control," *Gardner Manufacturing Co.*, Catalog No. 301, 8 pgs. (publicly known prior to Jan. 4, 1993).
Article, "Insect Traps For Use With Electric Radiant Energy Sources," *Source Unknown*, 4 pgs. (publicly known prior to Jan. 4, 1993).
"Stop 'um Silent Insect Containment Unit Zap 'em.," *Gardner Manufacturing Company*, 2 pgs. (1989).
Advertisement, "Stop 'um," *Gardner Manufacturing Co.*, 1 pg. (publicly known prior to Jan. 4, 1993).
Brochure, "Sanitary, Effective Fly Control for Food Handling and Other Sensitive Areas," *Vector Fly System*, 18 pgs. (publicly known prior to Jan. 4, 1993).
Brochure, "Zap Flying Insect Electrocuting Systems," *Gardner Manufacturing Co.*, 6 pgs. (publicly known prior to Jan. 4, 1993).
Catalog, "Insect Light Traps," *Don Gilbert Industries, Inc.*, 16 pgs. (publicly known prior to Jan. 4, 1993).
Catalog, "Gilbert®: Insect Light Traps," *Don Gilbert Industries, Inc.*, 32 pgs. (publicly known prior to Jan. 4, 1993).
Advertisement, "The Fly Magnet," *Ecolab®*, 2 pgs. (publicly known prior to Jan. 4, 1993).
"Flying Insect Control: Part 2, A Profit Opportunity" *A supplement to PCT Pest Control Technology Magazine*, 24 pgs., (Jun. 1998).
Advertisement, "WS-75, Adhesive Insect Light Trap," *Gardner Manufactauring*, 2 pgs. (publicly known as early as Jan. 1, 1999).
Advertisement, "Adhesive Insect Light Traps," *Gardner Manufacturing*, 2 pgs. (publicly known as early as Jan. 1, 1999).
"Surface Lighting," *Halo Lighting*, 3 pgs. (1990).
Brochure, "The Orkin Commercial Fly Control System," *Orkin*, 4 pgs. (Jun. 1997).
Brochure, "Acurid Orkin Designer: Decorative Insect Light Trap," *Orkin Acurid*, 2 pgs. (publicly known after 1998 but prior to Oct. 5, 2001).
Various Internet pages of manufacturers who sell Gardner products, 80 pgs. (Jan. 2000).

Advertisement, "Affordable Fly Control, Choose Your Weapon!," *Anderson Environmental Systems*, 1 pg. (publicly known as early as Nov. 1994).
Advertisement, "Insect-O-Cuter®," www.pestcontrolmag.com Magazine, p. 16 (Apr. 2000).
Brochure, "The Insect Inn IV™ is their fatal attraction.," *Paraclipse, Inc.*, 3 pgs. (1997).
Brochure, "Paraclipse™ Terminator: A Fly's Worst Enemy," *Paraclipse, Inc.*, 6 pgs. (1999).
"IES Lighting Handbook: The Standard Lighting Guide, Sections 6, 10, 15 and 25" *Edited by* John E. Kaufman, *Published by Illuminating Engineering Society*, Fourth Edition, pp. 6-1-6-20; 10-1-10-30; 15-1-15-26; and 25-1-25-23 (1966).
"IES Lighting Handbook: The Standard Lighting Guide, Section 25" *Edited by* John E. Kaufman *and* Jack F. Christensen, *Published by Illuminating Engineering Society*, Fifth Edition, pp. 25-1-25-24 (1972).
"IES Lighting Handbook: Application Volume, Section 19" *Edited by* John E. Kaufman *and* Howard Haynes, *Published by Illuminating Engineering Society of North America*, pp. 19-1-19-40 (1981).
"IES Lighting Handbook: Application Volume, Section 19" *Edited by* John E. Kaufman and Jack F. Christensen, *Published by Illuminating Engineering Society of North America*, pp. 19-1-19-41 (1987).
Brochure, "Lunchtime, The Mantis," *Pest West, B &W Sales & Marketing*, 4 pgs. (1998).
Brochure, "Luralite: Attractive Flying Insect Control," *Luralite*, 4 pgs., (1999).
Brochure, "The Insect Inn IV™ is their fatal attraction.," *Paraclipse, Inc.*, 6 pgs. (1999).
"Prescription Treatment Food Safety," *Whitmire Micro-Gen Research Laboratories, Inc.*, 10 pgs. (Aug. 1999).
Manual, "Vector System," *Micro-Gen Equipment Corp.*, pp. 1-9 (Oct. 1991).
Brochure, "No-Zap Flytraps will control your flying insect problem!!! We Guarantee It!!!," *CCI Industries, Inc.*, 4 pgs. (Apr. 1999).
Brochure, "Guardian® Hanging Fly Trap: Glueboard Model GBH362," *Insect-O-Cutor*, 1 pg. (Sep. 1998).
Brown, J., "A revolution in electronic fly traps," *Journal of Environmental Health*, pp. 267 (May/Jun. 1989).
Weidhaas, D. et al., "Insect Electrocuting Light Trap Research, First Edition," *Don Gilbert Industries, Inc.*, pp. 1-96 (Aug. 1988).
Sudjic, D., "The Lighting Book: A Complete Guide to Lighting Your Home," *Crown Publishers, Inc.*, 16 pgs. (1985).
"wil-kil.com: Focusing on Quality IPMI," http://www.wil-kil.com/index1024.html, 7 pgs. (Jun. 7, 2002).
"DecoCatch™ ILT," http://www.wil-kil.com/business/popups/decocatchdetails.html, 1 pg. (Jun. 6, 2002).
Gilbert, D. et al., "Gilbert® Strategic Installation of Professional Flytraps," http://www.gilbertinc.com/strategi.htm, 4 pgs. (Nov. 2002).
*Interior Design Magazine*, 3 pgs. (May 1990).
*Interior Design Magazine*, 2 pgs. (Apr. 1991).
*Interior Design Magazine*, 2 pgs. (Jun. 1991).
*Interior Design Magazine*, 2 pgs. (Jul. 1991).
*Interior Design Magazine*, 3 pgs. (Sep. 1991).
Catalog, "Surface Lighting," *Halo Lighting*, 5 pgs. (1990).
Catalog, "Progress Lighting Ideas," *Progress Lighting*, vol. 120, 5 pgs. (1990).
Catalog, "The Complete Home Furnishings Catalog," *Conran*, 2 pgs. (Spring 1989).
Catalog, "Halo Surface Lighting," *Halo Lighting*, 7 pgs. (Jan. 1987).
Catalog, "Scott 1988 Supplement: Wall Fixtures by Scott®," *Scott*, 2 pgs. (1988).
Catalog, "Boyd," *Boyd Lighting Company*, 11 pgs. (1987).
Advertisement, "The Mantis catches the small flies the others leave behind!," *Pest West™ Flying Insect Solutions*, 4 pgs. (Date Unknown).
Brochure, "The Lighted Fly Glue Trap. It's Outta Sight!," *Catchmaster*, 1 pg. (Date Unknown).
Brochure,"Introducing: The Lighted Fly Glue Trap. It's Outta Sight!," *Catchmaster*, 1 pg. (Date Unknown).
Brochure, "FICS: Flying Insect Control System: A Safe, Hygienic Answer to Flying Insects," *Rentokil*, 2 pgs. (Date Unknown).

Shaheen, L., "Light Traps Spark Focus On Prevention," *Pest Control*, 2 pgs. (Date Unknown, between May 1992 and May 1999).
Advertisement, "Make A Million Little Problems Disappear," *Ecolab Inc.*, 4 pgs. (1996).
Advertisement, "Flies: Stealth Fly Program," *Ecolab Inc.*, 4 pgs. (2000).
Price List, "Fly Killer Retail Price List," *P & L Systems LLC*, 1 pg. (publicly known after Jan. 4, 1993, but prior to Nov. 21, 1994).
Advertisement, "They're attracted to food. They're attracted to light. They're attracted to other flies. The Insect Inn II™ is their fatal attraction," *Paraclipse, Inc.*, 6 pgs. (1994).
"Selecting a Professional Flytrap," http://gilbertinc.com/gluetrap.htm, 5 pgs. (publicly known as early as Feb. 28, 2000).
Brochure, "See the Light with Ecolab's Latest Weapon for Flying Insect Defense: The Fly Magnet," *Ecolab Inc.*, 2 pgs. (publicly known prior to Jan. 4, 1993).
Brochure, "The Vector Fly System," *Micro-Gen Equipment Corp.*, 10 pgs. (publicly known prior to Jan. 4, 1993).
"Specifications Model 924 Flintrol," *Gilbert Electronics, Inc.*, 1 pg. (publicly known prior to Jan. 4, 1993).
Brochure, "The Vector Fly System simply works better than other fly control options for food handling areas," *Micro-Gen Equipment Corp.*, 6 pgs. (publicly known prior to Jan. 4, 1993).
Brochure, "WIL-KIL Sheds Light on the Future of Fly Control," *Wil-Kil Pest Control*, 2 pgs. (Date Unknown).
Brochure, "Flying Venus Wall Sconce/Fly Trap," *Gilbert Industries, Inc.*, 6 pgs. (publicly known after Jan. 4, 1993 but prior to Nov. 21, 1994).
Brochure, "Adhesive Insect Light Traps," *Orkin Acurid*, 1 pg. (publicly known as early as Jan. 1, 1999).
Brochure, "Adhesive Insect Light Traps," *Gardner Manufacturing*, 8 pgs. (publicly known as early as Jan. 1, 1999).
Brochure, "Fly Control for Restaurants," *Gardner Manufacturing*, 2 pgs. (publicly known as early as Jan. 1, 1999).
Catalog, "Gardner Insect Light Traps," *Gardner Manufacturing*, 8 pgs. (publicly known as early as Jan. 1, 1999).
Advertisement, "Stop Fly Problems! Get the *Mirage* WS-50 decorative Fly Light," *Gardner Manufacturing*, 11 pgs. (publicly known as early as Nov. 1994).
Catalog, "Gardner Environmental Products: Insect Light Traps," *Gardner Manufacturing*, 8 pgs. (publicly known as early as Nov. 1994).
Advertisement, "WS-50," *Gardner Manufacturing*, 2 pgs. (publicly known as early as Nov. 1994).
Advertisement, "WS-50 Adhesive Insect Light Trap," *Gardner Manufacturing*, 2 pgs. (publicly known as early as Nov. 1994).
"Product Catalog," *Gardner Manufacturing Environmental Products Division*, 8 pgs. (publicly known as early as Nov. 1994).
Brochure, "GT-200, We put fly control in a new light!," *Source Unknown*, 4 pgs. (publicly known as early as Nov. 1994).
Brochure, "Gardner Environmental Products, Insect Light Traps," *Gardner Manufacturing*, 8 pgs. (publicly known as early as Nov. 1994).
"Gardner Environmental Products, Product Catalog," *Gardner Manufacturing*, 8 pgs. (publicly known as early as Nov. 1994).
Advertisement, "Capture Flies in Style, "Diamond V" Wall Sconce/Insect Light Trap," *Gardner Manufacturing*, 2 pgs. (publicly known as early as Nov. 1998).
Winona Light Internet Catalog of Wall Sconces, www.artemide.com/cgi/page_ds.php?fam & pro & lan=2&lin=4&vet=0, www.lightwayind.com; www.visalighting.com, and www.winonalighting.com, 28 pgs. (known to Applicant as of Mar. 2000).
"Gardner Insect Control," *Gardner Manufacturing*, http://www.gardnermfg.com/insect/, 20 pgs. (known to Applicant as of May 9, 2002).
Various Web Pages of manufacturers in the industry, 26 pgs. (known to Applicant as of Aug. 26, 2002).
"No Zap Flytraps," http://www.amer-rest-equip.com/cci/cci_zap.html, 2 pgs. (known to Applicant as of Aug. 26, 2002).
B & G Equipment Company, http://bgequip.com/, 5 pgs. (known to Applicant as of Aug. 26, 2002).
Luralite, http://www.bugspray.com/catalog/products/page1442.html, 2 pgs. (known to Applicant as of Aug. 26, 2002).
Catchmaster, http://www.catchmaster.com/, 14 pgs. (known to Applicant as of Aug. 26, 2002).
Country Vet, http://www.country-vet.com/indProduct.php4?itemNum=xxxxxxx, 1 pg. (known to Applicant as of Aug. 26, 2002).
"Advantage Traps Flytraps, and interesting Fly Facts," http://www.flyfacts.com/HTML/uses.htm, 4 pgs. (known to Applicant as of Aug. 26, 2002).
Fly Traps, http://www.flytrappers.com/luralite.htm, 2 pgs. (known to Applicant as of Aug. 26, 2002).
"Insectu-O-Cutor Insect Control Products," http://www.germ-o-ray.com/iocpages/iocprods.html, 2 pgs. (known to Applicant as of Aug. 26, 2002).
"Gilbert® Website Central," http://www.gilbertinc.com/, 29 pgs. (known to Applicant as of Aug. 26, 2002).
"Insect Control World-Insect Control and Fly Trap Devices by Restaurant Equipment," http://www.insectcontrolworld.com/, 6 pgs. (known to Applicant as of Aug. 26, 2002).
"Starkeys Products," http://members.iinet.net.au/~starkey/, 12 pgs. (known to Applicant as of Aug. 26, 2002).
"Paraclipse, Inc., Columbus, NE, feature the Insect Inn IV and Terminator automated," 16 pgs. (known to Applicant as of Aug. 26, 2002).
"Advantage Fly Trap," http://www.pestproducts.net/flytrap.htm, 2 pgs. (known to Applicant as of Aug. 26, 2002).
"PestWest-Flying Insect Solutions," http://www.pestwest.com/home.cfm?lang=3, 5 pgs. (known to Applicant as of Aug. 26, 2002).
"Flying Insect: Introducing Aurora 360," http://www.watco.com/aurora2.htm, 5 pgs. (known to Applicant as of Aug. 26, 2002).
Whitemire Micro-Gen Research Laboratories, Inc. Website, http://www.wmmg.com/default.htm, 17 pgs. (known to Applicant as of Aug. 26, 2002).
Gilbert, D. et al., "Strategic Installation of Insect Light Traps," *Gilbert Manufacturing*, pp. 4-19 (publicly known after 1998 but prior to Oct. 5, 2001).
Catalog, "Gilbert Professional Flytraps," *Gilbert Manufacturing*, 21 pgs. (publicly known after 1998 but prior to Oct. 5, 2001).
Brochure, "Illumé, the first name in discreet insect control," *ACtron Incorporated*, 1 pg. (Date Unknown, although not publicly known prior to Jan. 5, 1993).
Brochure, "Illuméstylish insect control," *ACtron Incorporated*, 2 pgs. (Date Unknown, although not publicly known prior to Jan. 5, 1993).
"B&G's Integrated House Fly Program," *B &G Equipment Company*, pp. 1-33, (Date Unknown, although not publicly known prior to Jan. 5, 1993).
"Fly Control Solutions," *B &G Equipment Company*, pp. 1-8 (Date Unknown, although not publicly known prior to Jan. 5, 1993).
"Do you recognize this threat to food safety?," *Ecolab Inc.*, 4 pgs. (Date Unknown, although not publicly known prior to Jan. 5, 1993).
"Dedicated To Hygiene," *P+L Systems LLC*, 21 pgs. (Date Unknown, although not publicly known prior to Jan. 5, 1993).
Brochure, "Meet the Bacteria Brothers," *Paraclipse, Inc.*, 2 pgs. (Date Unknown, although not publicly known prior to Jan. 5, 1993).
Photographs of Device GT-100, 1 pg. (publicly known prior to Jan. 4, 1993).
Photographs of the Vector Flying Insect Trap, 3 pgs. (Date Unknown).
Photographs of wall sconces, 4 pgs. (publicly known prior to Jan. 4, 1993).
Photographs of Progress Lighting Model No. P7101-30, 2 pgs. (Date Unknown).
"Progress Lighting Ideas," *Ja-Mar Elec. Supply/Lighting*, 2 pgs. (Date Unknown).
"CB Aurora 360, Illuminated Fly Trap System with Scented Pheromone Attractant," *CB Waterbury Companies, Inc.*, 4 pgs. (1997).
"The Vector Fly System," *Whitmire Micro-Gen Research Laboratories, Inc.*, 4 pgs. (Date Unknown).
Photographs of Device: Carol Clamp Light Model #04170.94.MP, A277-894, *TF Carol Cable Company*, 3 pgs. (Date Unknown).
Photographs of HALO Lighting Metro Quarter Sphere Model No. H2572PB, 2 pgs. (Date Unknown).
Photographs of VISA Lighting wall sconce CB 2220, 2 pgs. (publicly known prior to Jan. 4, 1993).

Photographs of VISA Lighting wall sconce CB 3020, 2 pgs. (publicly known prior to Jan. 4, 1993).

Photographs of VISA Lighting wall sconce CB 3024, 2 pgs. (publicly known prior to Jan. 4, 1993).

Photographs of VISA Lighting wall sconce CB 3082, 2 pgs. (publicly known prior to Jan. 4, 1993).

Photographs of VISA Lighting wall sconce CB 2850, 2 pgs. (publicly known prior to Jan. 4, 1993).

Goldsmith, T. et al., "The Sensitivity Of Housefly Photoreceptors In The Mid-Ultraviolet And The Limits Of The Visible Spectrum," *J. Exp. Biol.*, vol. 49, No. 3, pp. 669-677 (Dec. 1968).

Syms, P. et al., "The effect of flickering U-V light output on the attractiveness of an insect electrocutor trap to the house-fly, *Musca domestica*," *Entomol. exp. appl.*, vol. 43, No. 1, pp. 81-85 (Feb. 1987).

Roberts, A. et al., "Intensity and spectral emission as factors affecting the efficacy of an insect electrocutor trap towards the house-fly," *Entomol. exp. appl*, vol. 64, No. 3, pp. 259-268 (Sep. 1992).

Lillie, T. et al., "Operational Testing of Electrocutor Traps for Fly Control in Dining Facilities," *Journal of Economic Entomology*, vol. 80, No. 4, pp. 826-829 (Aug. 1987).

Thimijan, R. et al., "A Method for Predicting House Fly Attraction of Electromagnetic Radiant Energy," *Journal of Economic Entomology*, vol, 66, No. 1, pp. 95-100 (Feb. 15, 1973).

Miall, R., "The flicker fusion frequencies of six laboratory insects, and the response of the compound eye to mains fluorescent 'ripple'," *Physiological Entomology*, vol. 3, No. 2, pp. 99-106 (Jun. 1978).

Pickens, L. et al., "Design Parameters That Affect the Performance of UV-emitting Traps in Attracting house Flies (*Diptera: muscidae*)," *Journal of Economic Entomology*, vol. 79, No. 4, pp. 1003-1009 (Aug. 1986).

Hollingsworth, J. et al., "Effect of Components on Insect Light Trap Performance," *American Society of Agricultural Engineers*, vol. 15, No. 5, pp. 924-927 (1972).

\* cited by examiner

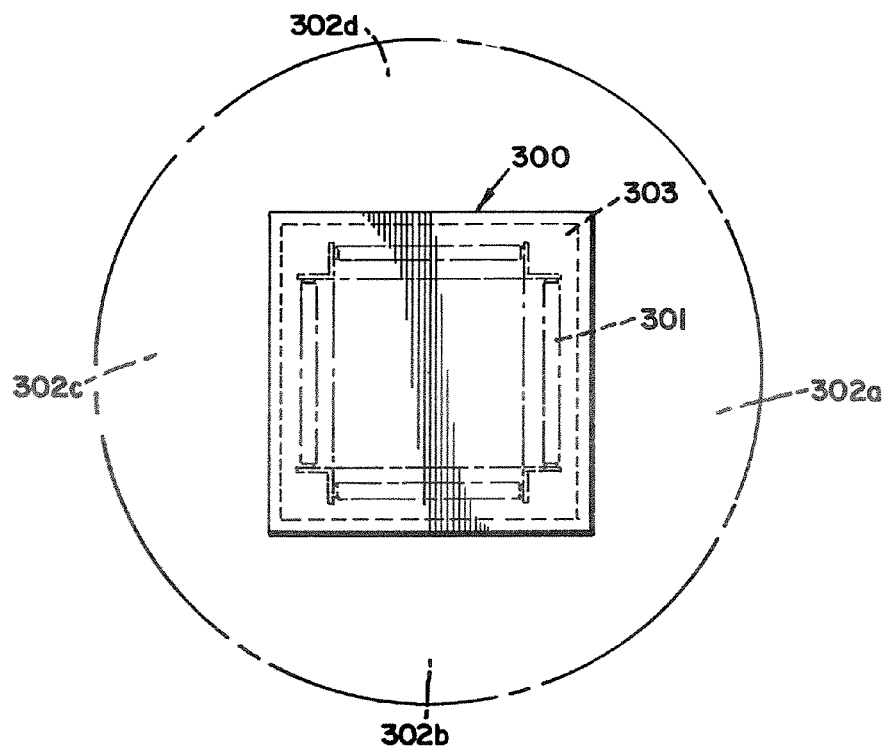
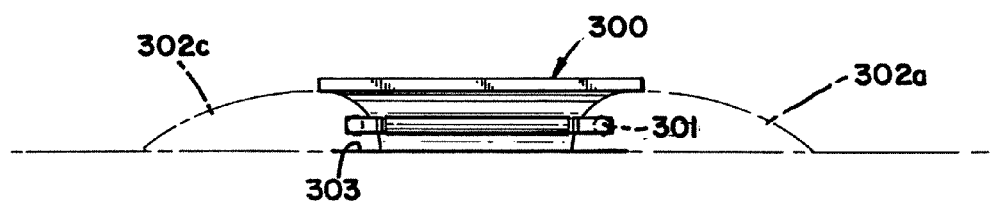

FLY TRAP WITH MULTIPLE LIGHT PATTERNS

RELATED APPLICATIONS

This application is continuation of U.S. Ser. No. 10/033,634, filed Dec. 27, 2001, now abandoned which is a divisional of Nelson et al., U.S. Ser. No. 08/629,049, filed on Apr. 8, 1996, now U.S. Pat. No. 6,959,510 which is hereby incorporated herein by reference in its entirety, which is a continuation-in-part of Nelson et al., U.S. Ser. No. 08/327,108, filed Oct. 21, 1994, U.S. Pat. No. 5,505,017, issued on Apr. 9, 1996. U.S. Pat. No. 5,505,017 is a continuation of application. Ser. No. 08/000,264 filed Jan. 4, 1993, now U.S. Pat. No. 5,365,690, issued Nov. 22, 1994.

FIELD OF THE INVENTION

The invention relates to an illuminated trap that can attract flying insects and immobilize the insects within a trap housing. The trap uses a housing to enclose an insect attractant light. The housing and cooperative internal reflecting surfaces form a multidirectional pattern of light on a flat mounting surface such as a wall or ceiling. The pattern can contain one, or two, three or more, overlapping or non-overlapping, light displays positioned generally in arbitrary directions. In a bidirectional trap, the direction of the light from the displays on the flat mounting surface are positioned at 180° apart. Such a configuration can increase capture rates. In other traps with three or more light displays the light patterns can be positioned at regular intervals or positioned arbitrarily. The invention also relates to a flying insect trap using illumination in a pattern substantially surrounding the trap to attract flying insects.

BACKGROUND OF THE INVENTION

A number of flying insect traps using attractant light sources have been proposed in the prior art. The Insect-O-Cutor fly traps made by I-O-C use an exposed bulb with a high voltage electrocuting systems. Pickens and Thimijan disclose exposed UV-emitting light sources and electrified grids for trapping and electrocuting flying insects. Another trap system generally uses frontally or horizontally exposed ultraviolet black lights for attracting insects to the trap. In the trap the insect lands on an electric grid in the rear of the cabinet. The grid provides a low voltage pulse that causes the insect to fly down onto a nontoxic adhesive trapping board. The captured insect can then be disposed with the removable adhesive sheet. Similarly, Grothaus et al., U.S. Pat. No. 4,696,126, discloses an exposed bulb adhesive trap. Lazeroni, Sr. et al., U.S. Pat. No. Des. 325,954, discloses a generally front facing exposed bulb trap. Aiello et al., U.S. Pat. No. 4,959,923, is related to Lazzeroni, Sr. et al., U.S. Pat. No. Des. 325,954, using ultraviolet light source pulsed electricity to stun insects and an adhesive trap. Similarly, Gilbert insect light traps use exposed bulbs and generally front facing entry spaces for fly trapping purposes. Such traps attract pests to the front of the trap using light directed into a room away from the trap. Hollingsworth and Hartstack, Jr. disclose data relating to the efficiency of a variety of components of exposed bulb fly traps.

Larkin, U.S. Pat. No. 4,949,501, and the ARP Venus Fly-lite™ system disclose an attractant light source. The light source and its housing are hinged on a wall attachment means such that the unit can be used in either a vertical mode wherein the light source is parallel to the vertical surface and is placed at an angle of 90° to the horizontal surface perpendicular to a vertical surface. In this so called invisible mode, used during business hours, the trap is designed to maintain the operational components of the fly trap away from the detection. The fly trap can be placed in a "turbo" mode wherein the light source and housing are perpendicular to the vertical surface and horizontal to the floor (or at an angle greater than 90° to the vertical surface) thus exposing the light directly to view at the installation site which is asserted to increase insect attraction.

White, U.S. Pat. No. 4,876,822, discloses flying insect unit comprising a rectangular housing enclosing a light source and an adhesive trapping surface. The housing components are either parallel to or perpendicular to the vertical mounting surface. Nelson et al., U.S. Pat. No. 5,365,690, show a housing forming a pattern of insect attractant light on a mounting surface.

BRIEF DISCUSSION OF THE INVENTION

We have developed an improved flying insect trap that utilizes an improved and surprisingly effective display of radiated and reflected light directed in at least two overlapping or non-overlapping directions. The display can project two attractive light patterns on a planar mounting surface such as a wall or a ceiling which are directed in opposite directions from the trap. Further, the invention can involve forming a display of three light patterns on the planar surface. Each pattern directed to form non-overlapping patterns at a 120° spacing. Further, the light trap of the invention can contain four distinct patterns formed on the planar surface at approximately 90° intervals around the housing. Further, such a trap can project five, six, seven or more distinct patterns from a central housing to form an attractive light pattern on a planar surface. A further embodiment of the flying insect trap of this invention is a trap that forms a continuous pattern of light around and surrounding a central housing. The shape of any light pattern from any of the embodiments discussed can vary depending on the source of the insect attracting light, the position of the trap and light source, the size of the trap, the shape and reflectivity of the internal components of the housing and the geometry of the substantially planar mounting surface. Based on the design attributes of the housing and any reflecting surface within the housing, the shape of the insect attracting light pattern on the wall can be configured to any arbitrarily selected pattern such as a roughly rectangular pattern, a roughly "fan-shaped" pattern, roughly oval or elliptical patterns, or in a substantially circular pattern. When using a housing that forms a continuous pattern of light around the housing, the housing can be circular, oval, triangular, square, pentagonal, hexagonal, etc., the continuous pattern of light can be formed using a substantially circular light source such as a circular fluorescent tube or can be formed by multiple light sources that form the substantially continuous display using overlapping light patterns.

We have found that the light, to be attractive in most areas and installation sites, must have an illumination level that is at least about five footcandles within the attractive pattern formed on the wall. We have found that the illumination obtained by the fly traps of this invention involve a housing that is configured to ensure that the bulk of the radiant energy emitted by the source of attracting light falls on the substantially planar mounting surface (generally a ceiling or wall surface) associated with the trap. Close to the trap, the illumination can be quite high from about 20 to about 50 footcandles of radiant light energy or more with typical fluorescent tube sources. As the distance between a measuring point and the fly trap increases, the illumination decreases such that at some point from the trap the illumination is less than about 5 footcandles. Generally, the patterns of attractive light can be a regular shape such as a circular pattern, a square pattern or can be an arbitrary or roughly triangular, rectangular, oval, ellipsoidal, fan-shaped or circular, etc. in their geometry. We have also found it important that the insect immobilization surface be installed within the housing and associated with the insect attractant light. The insect pests tend to alight upon the vertical mounting surface or fly directly into the trap. As the insects either walk or fly into the trap, they tend to fly to the insect attractant light and once in the trap, by random flying or walking, movement will more than likely be immobilized on the insect immobilization surface. The internal reflecting surfaces of the housing, freestanding or mounted, reflecting surfaces, and other aspects of the trap add reflected light to radiated light to form the attractive light patterns on the substantially planar mounting surface. We have found that the open entryway for the core access to the insect immobilization means within the trap adjacent to the pattern of light improves catching rates. The flying insect traps of the invention are typically mounted on a vertical planar such as a wall surface or a substantially planar ceiling surface. The flying insect trap should be mounted such that the entirety or a substantial portion of the reflected and radiated light can fall on the mounting surface to form an attractive light pattern.

For the purpose of this application, the term "multidirectional" flying insect trap can include both insect traps that have two, three, four or more discrete non-overlapping flying insect trapping patterns. The term "multidirectional" can also include flying insect traps that have two, three, four or more discrete but overlapping patterns. As the number of patterns increase, the patterns tend to fuse into overlapping patterns and when the insect trap has a large number of patterns, the patterns fuse into a substantially continuous pattern that substantially surrounds the trap. For the purposes of this application, the term "continuous" indicates that the light from the trap is directed in a pattern that illuminates the planar mounting surface (such as a ceiling or a wall) in a pattern that substantially surrounds the trap. Such a substantially continuous pattern can include small shadows arising from mounting brackets, light fixture, wire or other electrical or mechanical aspects of the housing, the mounting means, the lighting support brackets or any other aspect of the invention. Further for the purpose of this application, the term "substantially planar" indicates that the flying insect trap of the invention can be successfully mounted on a surface. Such surfaces can have some curvature such as a circular or ellipsoidal post or column. However, as long as the trap can be successfully mounted on such a surface and can form the multidirectional light pattern, such a surface can be considered substantially planar. For the purpose of this application, when installed in certain preferred orientations, the light inside the trap cannot be viewed at a position normal to the trap. The term "normal" indicates that the position of the viewer is at a 90° angle with respect to the intersection of two lines drawn on the mounting surface intersecting at the trap at a 90° angle.

BRIEF DESCRIPTION OF THE DRAWINGS

FIGS. 1-7 are each an embodiment of the fly trap of the invention. In each figure, the geometry of the trap forms two or more patterns of light or a continuous pattern of light surrounding the trap for insect attraction. The figures further show the installation of a source of insect attractant light and various placements of the insect immobilization surface.

DETAILED DESCRIPTION OF THE INVENTION

Figure 1:
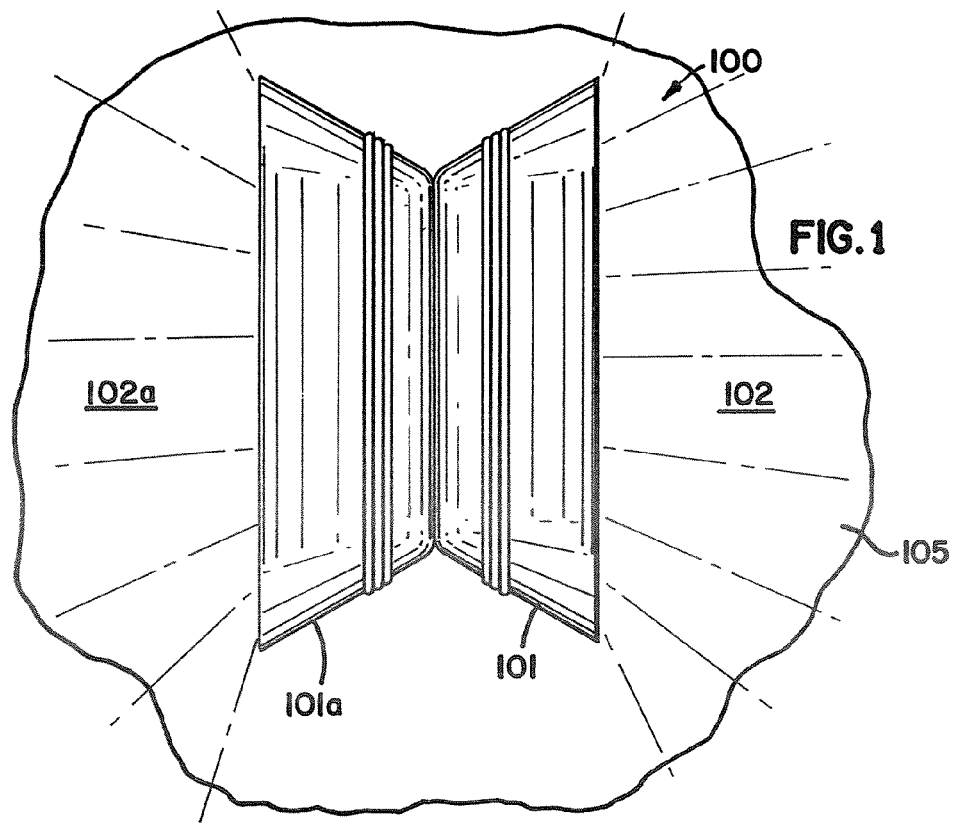

The improved fly traps of the invention include a housing, a source of insect attractant light and at least one fly immobilization means. The housing can contain two, three, four or more reflecting surfaces that ensure the majority of the radiant light from the source of insect attractant light is radiated and reflected to form the attractive light pattern on the substantially planar mounting surface. The display of light in an attractive pattern draws flies to the fly trap. Flies tend to alight on the illuminated pattern, the housing or other surfaces of the trap. The insect immobilization surface is positioned to ensure that the flying insect pest is likely immobilized within the trap after it is attracted to the trap.

We have found that a part of the light that radiates from the light source reflects from the internal surface of the housing and any other reflecting surfaces placed within the housing and appears on the planar mounting surface with directly radiated light. The reflected and radiated light form an attractive pattern of light on the associated planar surface. The housing either directs two or more distinct patterns of light onto the reflecting surface or directs a pattern of light that substantially surrounds the trap housing. In a first mode of the trap of the invention, the housing can contain one source of insect attractant light and two reflecting surfaces that form opposed (separated by 180° on the planar surface) reflected and radiated patterns of insect attractant light. When using one light source, the easiest trap to configure is a trap having the directions of the attracting pattern of light positioned in opposite directions, however, the direction of the light in the pattern can be at any arbitrary angle and can overlap or form separate patterns. The angle can be as small as 10 or 15° or up to 180° in direction between the individual light path. The selection of housing including internal reflecting surfaces and a source of insect attracting light must be selected to ensure that the attractive light patterns formed have at least five footcandles of energy in a pattern. This surface light intensity or illumination is important to maintain effective fly catch rates. In an alternative embodiment, the bidirectional light trap having two attractive light patterns can utilize two or more sources of insect attracting light to ensure that the illumination in or surface intensity of the attractive light patterns is sufficient for effective catch rates.

The second embodiment of the invention can include one or more sources of insect attractant light and a housing that cooperates with the light to form three distinct patterns of insect attracting light on the planar mounting surface. The housing can be triangular and can be configured with respect to the insect attractant light source such that the light patterns are formed on the wall in patterns that are separated around the housing by an angle of about 120°. The angles between patterns can be less than 120°. Further, the regular positioning of the light patterns around the trap increases the surface area of the attractive light patterns and also appears to increase or optimize catching rates.

In a further embodiment of the invention, one or more sources of insect attractant light, preferably four sources, are positioned within a housing such that four patterns of insect attractant light formed from radiated and reflected light are positioned around the housing. The patterns of light are positioned at a 90° separation of the direction of the patterns around the housing that can take the form of a square or rectangle. The geometry of this preferred housing embodiment of the invention can provide two, three, four, five or more distinct patterns of light arranged around a central housing separated by a regular angle to create displays of insect attractant light having an optimized area with illumination greater than 5 footcandles of power.

As the number of areas of light increase, the patterns in the display can fuse into a display of insect attractant light arranged substantially continuously around the housing. As a result, one important embodiment of this invention is a flying insect trap held within a housing that comprises a circular, oval, ellipsoidal or other such housing that cooperates with a source of insect attractant light that forms an attractive pattern that surrounds the housing with a pattern of insect attractant light. Depending on the housing geometry, the shape of the light pattern can be arbitrarily selected by the ordinary skilled artisan. However, we have found that the preferred shape of the light pattern is circular, oval, ellipsoidal, etc. in a regular geometric shape in which the light pattern has an illumination greater than 5 footcandles.

The housing can be mounted on a vertical planar surface such as a wall or on a horizontal planar surface such as a ceiling. The trap can be mounted such that a portion of the insect attracting light falls on both a wall and a ceiling surface or any other surface common in the trapping environment. The light source useful in the insect attractant trap of the invention comprises at least one source of ultraviolet light. Such sources are engineered to provide a substantial quantity of ultraviolet light but also can have some portion of the reflected and radiated light that falls within other portions of the electromagnetic spectrum other than within the ultraviolet portion. Such light sources are commonly incandescent or fluorescent electrically energized light sources that can emit a broad spectrum of wavelengths but are primarily optimized to emit ultraviolet light. For the purposes of the invention, ultraviolet light comprises electromagnetic radiation having wavelengths between about 400 nm and 4 nm that have been found attractive to flying insect pests. The light sources commonly provide from about 0.5 to about 100 watts of light output preferably the light provide from about 0.5 to about 75 watts or more. Preferred light sources are fluorescent light sources having sufficient wattage to form an attractive light pattern having an illumination of greater than about 5 footcandles. The trap can use a single source or two or more sources horizontally vertically or diagonally arranged in the housing. The light source can be linear or curvilinear (e.g., circular or oval or ellipsoidal) in shape or configuration and can also be the newer fluorescent tubes that are screwed into a screw type incandescent bulb type socket known as screw-in compact fluorescent bulbs. Such tubes can be used with housings adapted for their particular bulb geometry.

The light source or sources are substantially enclosed within a housing having an internal reflective surface. In the preferred housings, when the housing is installed in a fly catching environment, the occupants of the environment are typically not exposed to the direct radiation of the light. Accordingly, the housing substantially surrounds the source of insect attractant light preventing view from individuals in the environment while optimizing the size of the attractive light pattern on the planar mounting surface. Further, the housing while enclosing the source of insect attractant light acts as a entryway for flying insect pests. Accordingly, the opening should have a substantial area and not act as a barrier to the entry of the insect pests or to keep such pests from becoming immobilized on the insect immobilization surfaces within the trap. The housing can be configured with the light pattern of the trap positioned at any arbitrary angle to the vertical. The housing can be positioned such that the direction of a light pattern from a source onto a planar surface has a vertical orientation, or any other angle arbitrary selected during trap installation.

The light traps of this invention form two or more insect attracting light patterns on the vertical mounting surface. While the patterns may be displayed on the planar surface at regular intervals around the trap, the patterns can be formed on the mounting surface at virtually any relative angle.

The light source is substantially enclosed within a housing having an internal reflective surface.

The housing can take virtually any arbitrary shape consistent with using the housing or reflecting surfaces to reflect and radiate light onto the mounting surface to attract flying insects. The housing can be regular shape including a triangle, a square, a rectangle, a parallelogram, a circle, an oval, an ellipse, a teardrop shape, a star shape, or can be an irregular or amorphous shape.

The housing is commonly made from commonly available structural materials including a filled or unfilled thermoplastic such as polystyrene, polyethylene, polypropylene, polyethylene terephthalate (PET polyester), poly(acrylonitrile-butadiene-styrene), etc.; metallic materials such as aluminum, magnesium or related alloys, steel, stainless steel or other related ferrous alloys; wood or wood products; reinforced thermoplastics or thermosetting materials; paperboard, pressed paperboard, corrugated paperboard and virtually any other material that can form a housing with sufficient structural integrity such that the housing can withstand installation, bulb maintenance, installation and removal of the insect immobilization surfaces, cleaning and other maintenance or attention.

The interior of the housing can be highly or at least partially reflective. The housing can be made from a brilliant white, white or off-white material that can reflect the incident radiation to form a pattern. Such materials can be formed with internal pigments such as titanium dioxide, calcium carbonate or other white mineral that tends to reflect a major proportion of the incident radiation. Further, the housing can be painted or coated with reflective materials. A number of highly reflective white paints can be used that reflect substantially all the ultraviolet incident radiation. Further, metallic surfaces can be introduced made from thin sections of metal, metallized polyester, or any other shiny metallic surface. Specific examples of such reflective layers are aluminum foil, metallized polyester, bright-white reflective panels containing a substantial proportion of titanium dioxide white pigment, silvered glass mirrors or other related highly reflective surfaces.

A housing can also contain at least one insect immobilization means. For the purpose of this invention the term "insect immobilization means" includes any device or surface that can prevent flies from exiting the fly trap after entry. Such immobilization means can include pesticides in the form of a pesticidal surface, layer or trap, active and passive mechanical traps, liquid traps into which the flies become immersed, adhesive layers to which the flies become adhered, pressure sensitive adhesive layers, high or low voltage electric grids or other such means that can trap immobilized, kill or dismember the insect pests. The immobilization means can be installed on the housing, the mounting surface or in any location adjacent to the attractive light or light pattern.

A preferred insect immobilization means for purpose of this invention comprises a pressure sensitive adhesive surface. The most preferred surface comprises a highly tacky pressure sensitive adhesive surface that immobilizes the fly substantially if the fly comes into contact with any portion of the surface. The pressure sensitive adhesive surface can be made from a variety of known pressure sensitive adhesive materials that are highly tacky to the touch. One such known adhesive is the tangle trap adhesive made by The Tanglefoot Company. The positioning of the insect immobilization means within the housing is a design choice. The means can be positioned at virtually any location within the trap available to the flying insect pest. The pest can either fly into the trap or alight on the vertical mounting surface or on the housing and can then walk or be carried into the insect immobilization means by the operation of the trap. The preferred pressure sensitive adhesive trapping surface can be positioned within the trap on the vertical mounting surface, on the housing, on a trapping surface mounted directly adjacent to the source of insect attracting light or at any other position within the trap that is frequented by flying insect pests attracted to the pattern formed on the adjacent planar surface. The traps of the invention can include an insect attractant chemical. Such chemicals are typically organic materials that are at least somewhat volatile and are products arising from typical insect food sources or comprise a pheromone mixture directed to specific insect pests known to populate the trap environment.

The insect trap generally or the insect immobilization surface specifically can also contain an effective amount of an insecticide. A variety of non-volatile insecticides in formulated compositions are known to be effective against flying insects and most can be used. The preferred insecticide for use in the invention is a non-volatile formulated insect composition that is adapted to kill insect pests on contact. Such non-volatile insect pest compositions are not released into the trap environment. Such materials can include pyrethroid and organophosphate insecticide compositions. Such materials can be blended or formulated into the pressure sensitive adhesive on the insect immobilization surface or can be separately installed in a location within the trap.

The preferred mode of construction of the insect trap of the invention involves a geometry of the reflecting surface or surfaces in the trap that forms two, three, four, five or more discrete areas of attractant light, up to a housing that displays a continuous light pattern around the housing. The majority of the references in the prior art, however, are designed to direct their attractant light into the environment surrounding the light and not by radiating and reflecting the light onto a planar mounting surface adjacent to the trap. Nelson et al., U.S. Pat. No. 5,365,690 shows a trap that forms a single insect attracting pattern on an adjacent wall surface.

We have proposed an improved geometry of a housing over the prior art traps such that the attractancy of the light pattern produces greater than expected catch rates. By positioning two, three, four, five or more insect attractive light patterns around a housing up to an insect attractive pattern that surrounds the housing in its entirety, substantially improved catch rates can be achieved. The internal geometry of the housing, and any internal reflective surface within the housing either mounted on the housing surface or installed adjacent to a source of light can be positioned with respect to the mounting surface at an angle normal to the surface to ensure that the pattern of light formed by the housing contains a substantial amount of light. The insect traps of the invention can include a protective covering or grille over the opening to the housing. Such grilles are configured from wire or plastic meshes such that the flying insect pests can enter the trap but the grille or mesh does not substantially reduce the amount of light formed into the attractive pattern on the wall. For the purpose of this invention, grids or screens having a dimension sufficiently large to permit entry of insects, but can exclude larger objects while providing no substantial barrier to the reflection or radiation of light from the trap can be used. Such screens or grids can be made from a variety of materials including transparent, translucent or opaque materials. Such materials include metallic wires, synthetic or naturally occurring fiber threads, thermoplastic grids, grilles, expanded metal, wire screens, etc.

The insect trap of the invention can be placed on a horizontal substantially planar surface. Such surface can be adjacent to a second wall surface, adjacent to a ceiling surface or any other internal surface of the fly trap environment. Placement of the fly trap such that the trap can display a maximum area of light having greater than 5 footcandles illumination can ensure optimal catching rates. Such light can be reflected and radiated onto adjacent wall or ceiling surfaces without substantial reduction in trapping rates.

We have also found in our research and development that a contrasting color or apparent edge effect where the illumination abruptly terminates or falls on a dark color can be attractive to flying insect pests. Very often the contrast from a bright to a relatively darker portion at a distinctive edge can be recognized by flying insect pests and can be an attractive feature. Such contrast or edge effects can be produced by using sharply contrasting colors or textures in formation of the trap and for regions of trap installation.

When the flying insect trap of the invention is installed in a use environment, the trap includes mounting means that can be used to fix the flying insect trap of the invention onto a planar surface such as a wall or ceiling. Such mounting means includes a mechanical system that can support the weight of the trap and can maintain the orientation of the trap and ensure that the light forms useful attractive patterns on the surface. Such traps can be fixed in place using a variety of mounting hardware such as screws, bolts, nails, clips, flanges, etc. or can be temporarily placed in the use environment using velcro fasteners, pressure sensitive adhesive pads, epoxy or urethane construction adhesives, etc. An important characteristic of the mounting means of the fly trap of the invention is a selection of mounting means such that the trap is securely mounted on the wall or ceiling surface to receive the light from the trap to form an attractive light pattern. Further, the wall can act to define the opening of the fly trap.

The illumination or source of attractant light can be mounted directly in the housing or can be mounted to the vertical walls or ceiling surface surrounded by the housing. Preferably, the light trap is a unitary device having the light, the reflecting surfaces and the insect immobilization means fixed within the housing. However, any portion of the attractant system can be mounted on the vertical surface separate from the trap but preferably within the housing. If assembled in a single unit, the source of insect attracting light can be placed in an optimal position with respect to the housing and any optional additional reflecting surfaces to maximize the area and illumination of the attractive pattern. Similarly, the immobilization surface can be fixed in any location within the housing. The immobilization surface is preferably placed in location within the housing where the immobilized insect pests are hidden from view when viewed from the location of individuals within the typical environment. Preferably, the immobilization surfaces placed directly opposite the opening of the trap through which light travels to form the attractive surface pattern. Walking or flying insect pests when entering the trap from any arbitrary direction can then alight on the illuminated pattern, on the housing or any other internal or external surface. The insect immobilization surface is placed within the trap in such a fashion that the typical fly attracted by the light pattern will at some point enter the trap and become fixed on the immobilization surface. The insect trap housing comprises at least one reflecting surface which can be associated with the internal surface of the housing. The reflecting surface can have a variety of configurations with respect to the source of insect attracting light. The lights can be positioned vertically with respect to the reflecting surface such that the light is effectively radiated and reflected from the trap onto the mounting surface. The housing designed for placement on a vertical or horizontal surface can take a variety of shapes when viewed from the exterior of the trap. The shape of the housing can be arbitrarily selected while maintaining the internal reflecting surfaces of the trap such that a bidirectional, tridirectional, etc. light pattern can be formed on the adjacent wall surface while maintaining an arbitrary housing appearance that is generally circular, oval, ellipsoidal, square, rectangular, triangular, hexagonal, etc. The external surface or the internal reflecting surfaces can be planar, curved, angled or can be formed into any shape that does not prevent efficient reflection of light onto the attractive pattern. The location of the trap on the vertical (wall) surface or on the ceiling is arbitrarily selected. The placement can be in an area to which flies seem to be attracted in the environmental area. Accordingly, the trap can be mounted adjacent to windows, doors or ceiling fixtures having attractive light. Further, the traps can be placed adjacent to organic materials, or heat sources that also are known insect attracting materials. Typically, the insect traps of the invention are placed at or above eye level in the environmental space. Such placement is aesthetically appealing and does not detract from capture rates.

Experimental Section

Multiple Ultraviolet Light Pattern Experiment

Background and Objective

Ultraviolet light reflected and radiated onto a wall, forming a single "light pattern", above the top opening of an insect trap containing the source of ultraviolet light, is attractive to flying insects (U.S. Pat. Nos. 5,365,690 and 5,505,017). This experiment determines the effect multiple "light patterns" formed through top, side and bottom openings has on attraction of flying insects to an insect trap.

Method

1) Four Stealth Decora Tm fly traps are arranged in two arrays in a test "Flight Room" on a vertical mounting surface (white painted wall). A first array has four traps, jointed in a square arrangement, with the light patterns at right angles to an adjacent trap. The traps are placed with the light patterns directed away from the center of the arrangement. A second array at a similar right angle placement has all trap's light patterns directed to the center of the array.

2) Ultraviolet light source is one 9 watt lamp (Osram Dulux S, 9W/78) in each Stealth Decora, giving a total of 32 watts for the trap arrangements used.

3) A single control trap include a single Stealth Decora with four 9 watt lamps (32 watts total).

4) House flies are released in the "Flight Room" to provide a density of 0.1 fly per cubic foot and allowed to acclimate for two hours, food provided.

5) The above test arrangement and control settings are run in a randomized complete block design, one setting on the wall at a time.

6) Fly catch per half-hour is measured for each setting, then the setting is changed to the next one as called out in the randomized complete block design, and fly catch per half-hour is measured for that setting, etc.

7) At least four blocks are run to obtain at least four replicates for each setting.

8) Mean and median fly catch per half-hour are determined to evaluate setting performance.

Results

The first array is surprisingly effective in fly catch when compared to the control.

DETAILED DISCUSSION OF THE DRAWINGS

FIG. 1 is a view of a bidirectional flying insect trap of the invention as viewed when installed on a substantially planar vertical wall surface. FIG. 1 shows a bidirectional trap 100. The bidirectional trap contains a housing portion 101 which encloses a lamp and an immobilization strip. The housing 101 and 101a cooperates with the lamp to form two attractive non-overlapping light patterns 102 and 102a on walls 105 and 105a.

Figure 2:
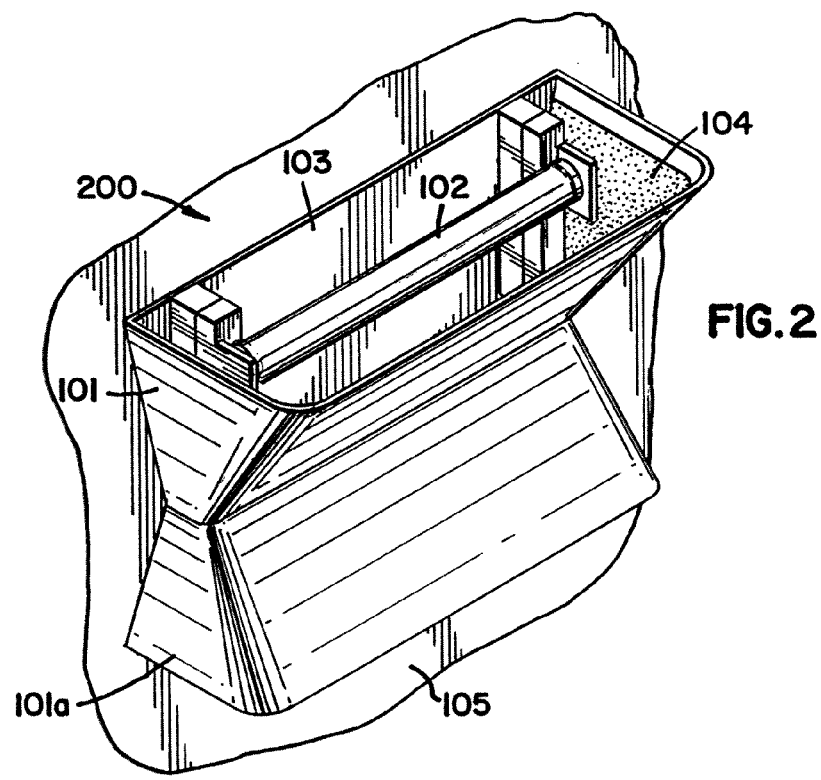

FIG. 2 is an internal view of the housing 101 and 101a of FIG. 1 in a horizontal installation. In the drawing is shown a trap generally at 200. In the inside of the trap is shown a source of ultraviolet insect attractant light shown as a fluorescent tube 102 held within a housing 101. An insect immobilization adhesive strip 103 is shown inside the housing 101. The lamp and the housing and the reflective surface 104 on the inside of the housing provide a display of reflected and radiated light 106 on the adjacent wall surface 105.

FIG. 3 shows a wall mounted trap having four overlapping patterns of flying insect attractant light. In FIG. 3, the trap 300 is generally shown. The trap incorporates four fluorescent UV sources of insect attractant light 301a, 301b, 301c, 301d. The lamps cooperate with the housing 304 to produce the attractive light patterns 302a, 302b, 302c, 302d.

FIG. 4 is a side view of the flying insect trap shown in FIG. 3. The trap 300 comprises a housing 304 which encloses lamps 301. The lamp and the housing cooperate to form the light pattern 302. The light pattern is formed by light rays emitted by the fluorescent bulb and concentrated on the substantially planar mounting surface. The housing also conceals an adhesive flying insect immobilization strip 303.

Figure 5:
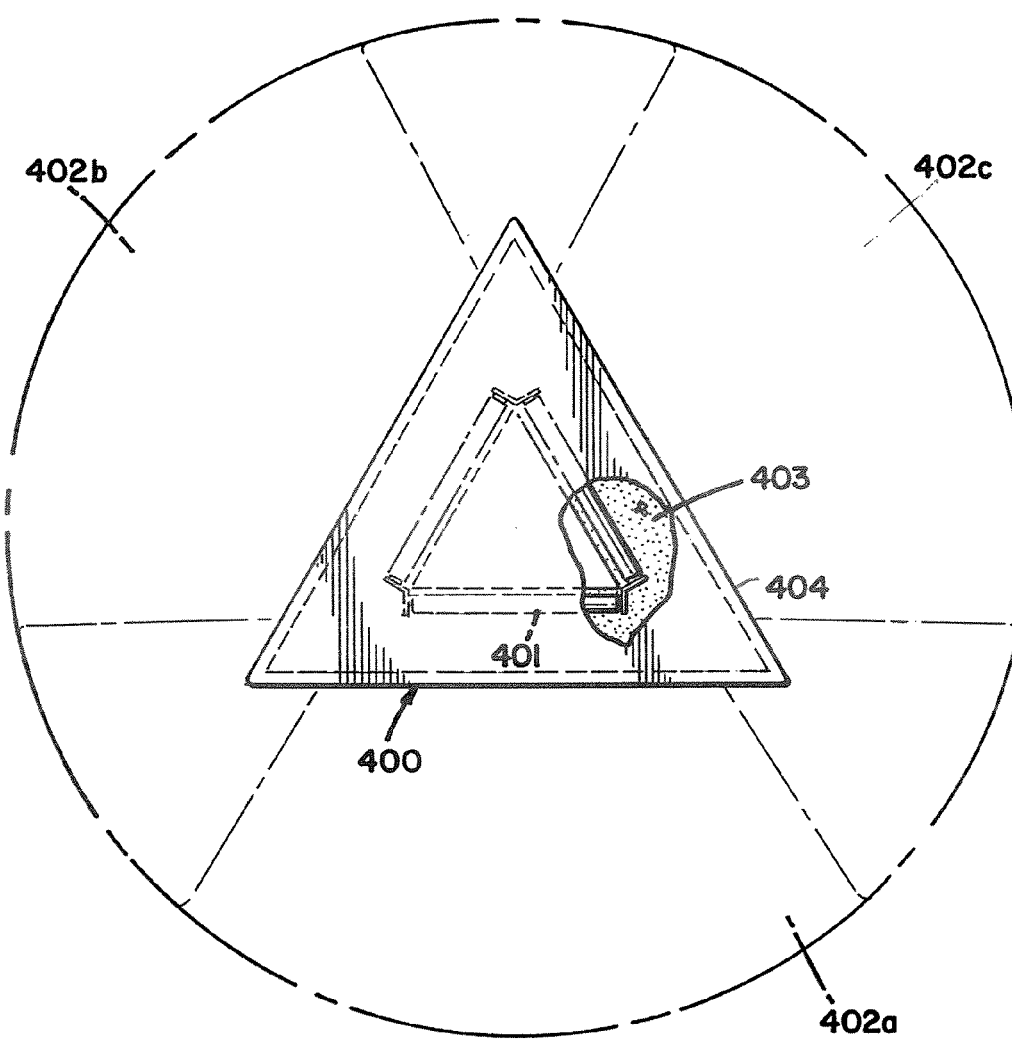

FIG. 5 is a view of a triangular flying insect pest trap 400 mounted on a planar vertical surface (wall). The trap housing 404 conceals the fluorescent insect attractant light emitting lamp 404 that cooperates with the trap housing 404 to form the attractive light patterns 402a, 402b, 402c. The trap housing 404 also conceals an adhesive insect immobilization surface 403 that uses a pressure sensitive adhesive material to trap flying insect pests.

Figure 6:
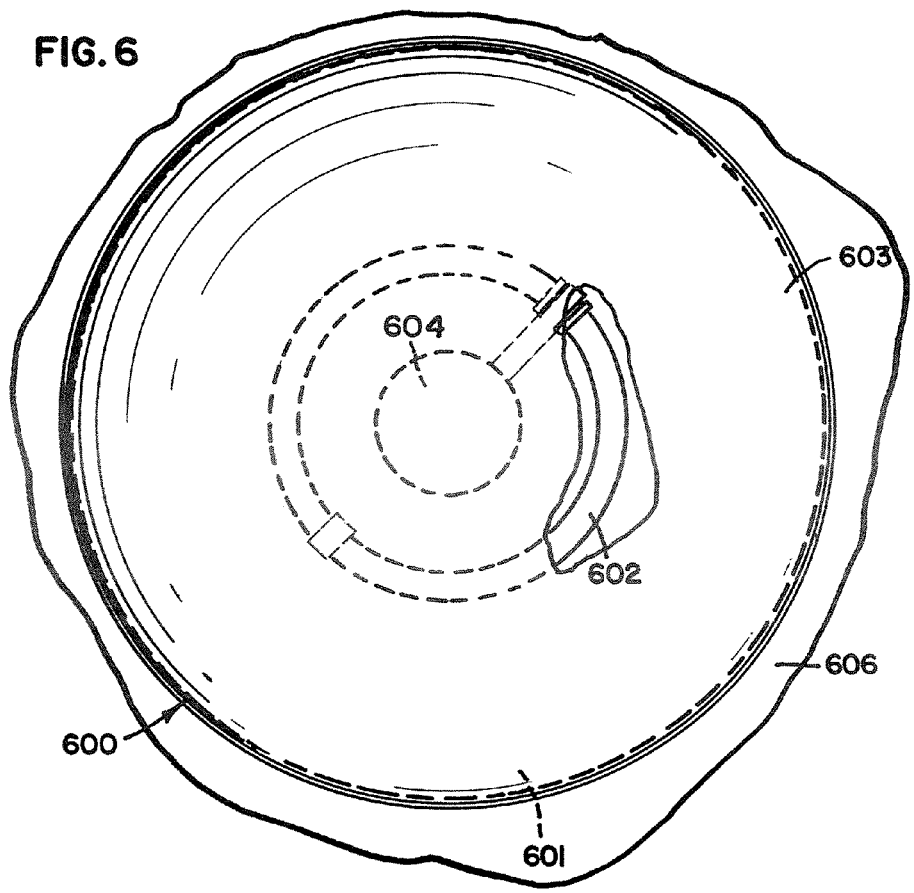

FIG. 6 is a view of a circular flying insect trap installed on a ceiling 606. The trap 600 comprises a curved housing 603. The curvature of the housing 603 is generally away from the wall but can also be directed to the wall. On the reverse side of the curved housing 603 is an insect immobilization adhesive sheet 601. The housing 603 and electrical box 604 is attached to the vertical mounting surface using a post not shown. The box 604 also supports fluorescent electrical apparatus and the fluorescent tubes 602 which emit the insect attractant light that forms a pattern on ceiling 606.

Figure 7:
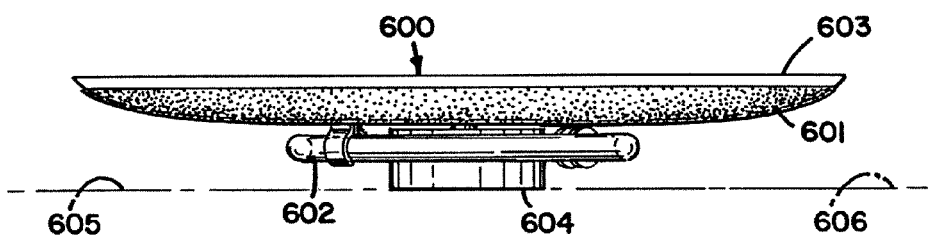

FIG. 7 is a side view of the flying insect trap of FIG. 6. The flying insect trap is mounted on the ceiling surface 606 using electrical box 604 to fix the housing 603 in place. On the reverse side of the housing is the insect immobilization pressure sensitive adhesive surface 601. Attached to the central electrical box 604 are electrical fluorescent tube driver equipment not shown and the fluorescent tubes providing the insect attractant light 602. The light from the lamps are directed onto the horizontal mounting surface (wall) to form the attractive light pattern 605.

We claim:

1. A flying insect trap, using insect attractant light displayed onto a substantially planar vertical mounting surface, said trap comprising:
   (a) means for mounting the flying insect trap on the planar vertical mounting surface;
   (b) at least one source of insect attractant light;
   (c) at least one insect immobilization surface; and
   (d) a housing, the housing configured to cooperate with the source of insect attractant light such that light from the source is directed into at least three non-overlapping insect attracting light patterns formed on the vertical planar mounting surface, and wherein the source of insect attractant light cannot be viewed when the viewer is positioned on a line normal to the mounting surface.

2. The trap of claim 1 wherein the housing comprises three sides and one of each of the three patterns is formed on one of each of the three sides of the housing.

3. The trap of claim 1 wherein each light pattern comprises radiated light.

4. The trap of claim 1 wherein each light pattern comprises both reflected and radiated light.

5. The trap of claim 1 wherein the three insect attracting light patterns are separated by about 120 degrees.

6. The trap of claim 1 wherein the housing is configured to cooperate with the source of insect attractant light such that light from the source is directed into four insect attracting light patterns formed on the planar mounting surface.

7. The trap of claim 6 wherein the four insect attracting light patterns are separated by about 90 degrees.

8. The trap of claim 1 wherein the source of insect attractant light comprises at least one source of ultraviolet light.

9. The trap of claim 1 wherein the insect immobilization surface comprises an adhesive surface.

10. The trap of claim 9 wherein the adhesive surface is mounted on the planar mounting surface.

11. The trap of claim 9 wherein the adhesive surface is mounted on a portion of the housing.

12. The trap of claim 1 wherein the planar mounting surface comprises a wall surface.

13. The trap of claim 1 wherein the housing comprises at least one internal reflecting surface positioned such that light from the source is directed onto the planar mounting surface.

14. The trap of claim 13 wherein the reflecting surface is a planar reflecting surface.

15. The trap of claim 13 wherein the reflecting surface is a curved reflecting surface.

16. The trap of claim 1 wherein the trap further comprises an insect attractant composition.

17. The trap of claim 1 wherein the housing comprises a one piece housing surrounding the source of insect attractant light.

18. The trap of claim 1 wherein the housing comprises three openings.

19. The trap of claim 1 wherein the housing comprises four openings.

20. The trap of claim 1 wherein the trap shape is a regular geometric pattern.

21. The trap of claim 1 further including three light sources, each light source creating a separate light pattern.

22. The trap of claim 21 wherein at least one of the three light sources is an ultraviolet bulb.

23. The trap of claim 21 wherein the three light sources are ultraviolet bulbs having a tubular configuration.

24. The trap of claim 1 wherein the housing includes a triangular planar plate.

25. A flying insect trap, using insect attractant light displayed onto a substantially vertical planar mounting surface, said trap comprising:
   (a) means for mounting the flying insect trap on the vertical mounting surface;
   (b) at least three sources of insect attractant light, including:
      (i) a first source;
      (ii) a second source; and
      (iii) a third source;
   (c) at least one insect immobilization surface;
   (d) a housing having a triangular configuration, the housing comprising at least three side openings, including:
      (i) a first side opening located on a first side of the housing;
      (ii) a second side opening located on a second side of the housing;
      (iii) a third side opening located on a third side of the housing; and
   (e) the first, second, and third side openings configured to partially enclose the first, second, and third sources of insect attractant light and cooperate with the sources of insect attractant light such that light from the sources is directed onto the vertical planar mounting surface to form at least three non-overlapping insect attracting light patterns, including:
      (i) a first light pattern;
      (ii) a second light pattern spaced 120 degrees from the first light pattern; and
      (iii) a third light pattern spaced 120 degrees from the second light pattern; and
   wherein the sources of insect attractant light cannot be viewed when the viewer is positioned on a line normal to the mounting surface.

26. A flying insect trap, using insect attractant light displayed onto a substantially vertical planar mounting surface, said trap comprising:
   (a) means for mounting the flying insect trap on the vertical planar mounting surface;
   (b) at least one source of insect attractant light;
   (c) at least one insect immobilization surface; and
   (d) a housing, the housing configured to cooperate with the source of insect attractant light such that light from the source is directed into at least three insect attracting light patterns formed on the vertical planar mounting surface, wherein the housing includes a triangular planar plate, and wherein the source of insect attractant light cannot be viewed when the viewer is positioned on a line normal to the mounting surface.

27. The trap of claim 26 wherein the housing comprises three sides and one of each of the three patterns is formed on one of each of the three sides of the housing.

28. The trap of claim 26 wherein each light pattern comprises radiated light.

29. The trap of claim 26 wherein each light pattern comprises both reflected and radiated light.

30. The trap of claim 26 wherein the three insect attracting light patterns are separated by about 120 degrees.

31. The trap of claim 26 wherein the source of insect attractant light comprises at least one source of ultraviolet light.

32. The trap of claim 26 wherein the insect immobilization surface comprises an adhesive surface.

33. The trap of claim 32 wherein the adhesive surface is mounted on the planar mounting surface.

34. The trap of claim 32 wherein the adhesive surface is mounted on a portion of the housing.

35. The trap of claim 26 wherein the planar mounting surface comprises a wall surface.

36. The trap of claim 26 wherein the housing comprises at least one internal reflecting surface positioned such that light from the source is directed onto the planar mounting surface.

37. The trap of claim 36 wherein the reflecting surface is a planar reflecting surface.

38. The trap of claim 36 wherein the reflecting surface is a curved reflecting surface.

39. The trap of claim 26 wherein the trap further comprises an insect attractant composition.

40. The trap of claim 26 wherein the housing comprises a one piece housing surrounding the source of insect attractant light.

41. The trap of claim 26 wherein the housing comprises three openings.

42. The trap of claim 26 wherein the light patterns are non-overlapping.

43. The trap of claim 26 wherein the trap shape is a regular geometric pattern.

44. The trap of claim 26 further including three light sources, each light source creating a separate light pattern.

45. The trap of claim 44 wherein at least one of the three light sources is an ultraviolet bulb.

46. The trap of claim 44 wherein the three light sources are ultraviolet bulbs having a tubular configuration.

47. A flying insect trap, using insect attractant light displayed onto a substantially planar vertical mounting surface, said trap comprising:
    (a) means for mounting the flying insect trap on the planar vertical mounting surface;
    (b) at least three sources of insect attractant light;
    (c) at least one insect immobilization surface; and
    (d) a housing, the housing configured to cooperate with the sources of insect attractant light such that light from the source is directed into at least three insect attracting light patterns formed on the vertical planar mounting surface, wherein the housing includes three sides, one of the light sources is positioned near each side, and one of each of the three patterns is formed on one of each of the three sides of the housing, and wherein the source of insect attractant light cannot be viewed when the viewer is positioned on a line normal to the mounting surface.

48. The trap of claim 47 wherein each light pattern comprises radiated light.

49. The trap of claim 47 wherein each light pattern comprises both reflected and radiated light.

50. The trap of claim 47 wherein the three insect attracting light patterns are separated by about 120 degrees.

51. The trap of claim 47 wherein the housing is configured to cooperate with the source of insect attractant light such that light from the source is directed into four insect attracting light patterns formed on the planar mounting surface.

52. The trap of claim 51 wherein the four insect attracting light patterns are separated by about 90 degrees.

53. The trap of claim 47 wherein the source of insect attractant light comprises at least one source of ultraviolet light.

54. The trap of claim 47 wherein the insect immobilization surface comprises an adhesive surface.

55. The trap of claim 54 wherein the adhesive surface is mounted on the planar mounting surface.

56. The trap of claim 54 wherein the adhesive surface is mounted on a portion of the housing.

57. The trap of claim 47 wherein the planar mounting surface comprises a wall surface.

58. The trap of claim 47 wherein the housing comprises at least one internal reflecting surface positioned such that light from the source is directed onto the planar mounting surface.

59. The trap of claim 58 wherein the reflecting surface is a planar reflecting surface.

60. The trap of claim 58 wherein the reflecting surface is a curved reflecting surface.

61. The trap of claim 47 wherein the trap further comprises an insect attractant composition.

62. The trap of claim 47 wherein the housing comprises a one piece housing surrounding the source of insect attractant light.

63. The trap of claim 47 wherein the housing comprises three openings.

64. The trap of claim 47 wherein the housing comprises four openings.

65. The trap of claim 47 wherein the light patterns are non-overlapping.

66. The trap of claim 47 wherein the trap shape is a regular geometric pattern.

67. The trap of claim 47 wherein at least one of the three light sources is an ultraviolet bulb.

68. The trap of claim 47 wherein the three light sources are ultraviolet bulbs having a tubular configuration.

69. The trap of claim 47 wherein the housing includes a triangular planar plate.

* * * * *